(12) United States Patent
Mänken

(10) Patent No.: US 11,422,222 B2
(45) Date of Patent: Aug. 23, 2022

(54) METHOD AND SYSTEM FOR DETERMINING THE POSITION OF AT LEAST ONE INDUSTRIAL TRUCK

(71) Applicant: Jungheinrich Aktiengesellschaft, Hamburg (DE)

(72) Inventor: Frank Mänken, Henstedt-Ulzburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 276 days.

(21) Appl. No.: 15/887,160

(22) Filed: Feb. 2, 2018

(65) Prior Publication Data

US 2018/0224518 A1 Aug. 9, 2018

(30) Foreign Application Priority Data

Feb. 3, 2017 (DE) ...................... 10 2017 102 116.7

(51) Int. Cl.
*G01S 5/00* (2006.01)
*G01S 5/14* (2006.01)
(Continued)

(52) U.S. Cl.
CPC .............. *G01S 5/0063* (2013.01); *G01S 1/08* (2013.01); *G01S 5/0215* (2013.01);
(Continued)

(58) Field of Classification Search
None
See application file for complete search history.

(56) References Cited

U.S. PATENT DOCUMENTS 6,298,306 B1 * 10/2001 Suarez ................. G01S 5/0018
701/300
7,616,682 B2 * 11/2009 Small ....................... G01S 1/24
375/220

(Continued)

FOREIGN PATENT DOCUMENTS

DE 102006038856 A1 2/2008
DE 102008011539 B3 6/2009
(Continued)

OTHER PUBLICATIONS

Translation for DE 102006038856 (Year: 2006).*
(Continued)

*Primary Examiner* — Peter D Nolan
*Assistant Examiner* — Michael F Whalen
(74) *Attorney, Agent, or Firm* — Barclay Damon LLP

(57) ABSTRACT

A method is provided for transmitting data in a system for determining a location of at least one industrial truck comprising a mobile radio station and positioned in an area having a plurality of stationary radio stations. The method comprises transmitting a position-determining signal from the mobile radio station to the plurality of stationary radio stations. The position-determining signal is received and a position signal is transmitted from the plurality of stationary radio stations to the mobile radio station. Additional data is appended to at least one of the position-determining signal and the position signal and is evaluated. A current vehicle position is then determined from at least three received position signals.

13 Claims, 2 Drawing Sheets

(51) Int. Cl.
*G01S 1/08* (2006.01)
*G01S 5/02* (2010.01)
*G01S 5/08* (2006.01)
*G05D 1/02* (2020.01)

(52) U.S. Cl.
CPC .......... *G01S 5/0221* (2013.01); *G01S 5/0231* (2013.01); *G01S 5/08* (2013.01); *G01S 5/14* (2013.01); *G05D 1/028* (2013.01); *G01S 5/0072* (2013.01); *G01S 2205/002* (2013.01)

(56) References Cited

U.S. PATENT DOCUMENTS

| | | | |
|---|---|---|---|
| 2003/0028323 A1* | 2/2003 | Zeitler | G01S 5/14 701/408 |
| 2008/0153509 A1* | 6/2008 | Piekarski | G01S 19/48 455/456.2 |
| 2009/0201152 A1* | 8/2009 | Karr | G01S 15/876 340/545.6 |
| 2009/0222159 A1 | 9/2009 | Bauer | |
| 2010/0127853 A1 | 5/2010 | Hanson et al. | |
| 2010/0231926 A1* | 9/2010 | Manken | G01S 3/784 356/614 |
| 2014/0208113 A1* | 7/2014 | Nakano | H04L 63/06 713/171 |
| 2021/0048502 A1* | 2/2021 | Gummadi | G01S 5/0226 |
| 2021/0329528 A1* | 10/2021 | Kang | H04W 40/02 |

FOREIGN PATENT DOCUMENTS

| | | | |
|---|---|---|---|
| DE | 102008036412 A1 | 2/2010 | |
| DE | 102009004854 A1 | 7/2010 | |
| DE | 102009013671 A1 | 9/2010 | |
| DE | 102011018520 A1 | 9/2012 | |
| DE | 102012016783 A1 | 3/2013 | |
| EP | 1167155 A1 | 1/2002 | |
| WO | WO-0148506 A2 * | 7/2001 | G01S 19/22 |
| WO | 03/012470 A2 | 2/2003 | |
| WO | 2008/022622 A1 | 2/2008 | |

OTHER PUBLICATIONS

EP 18153443; filed Jan. 25, 2018; Jungheinrich Aktiengesellschaft; European Search Report dated Jul. 3, 2018 (8 pages).

* cited by examiner

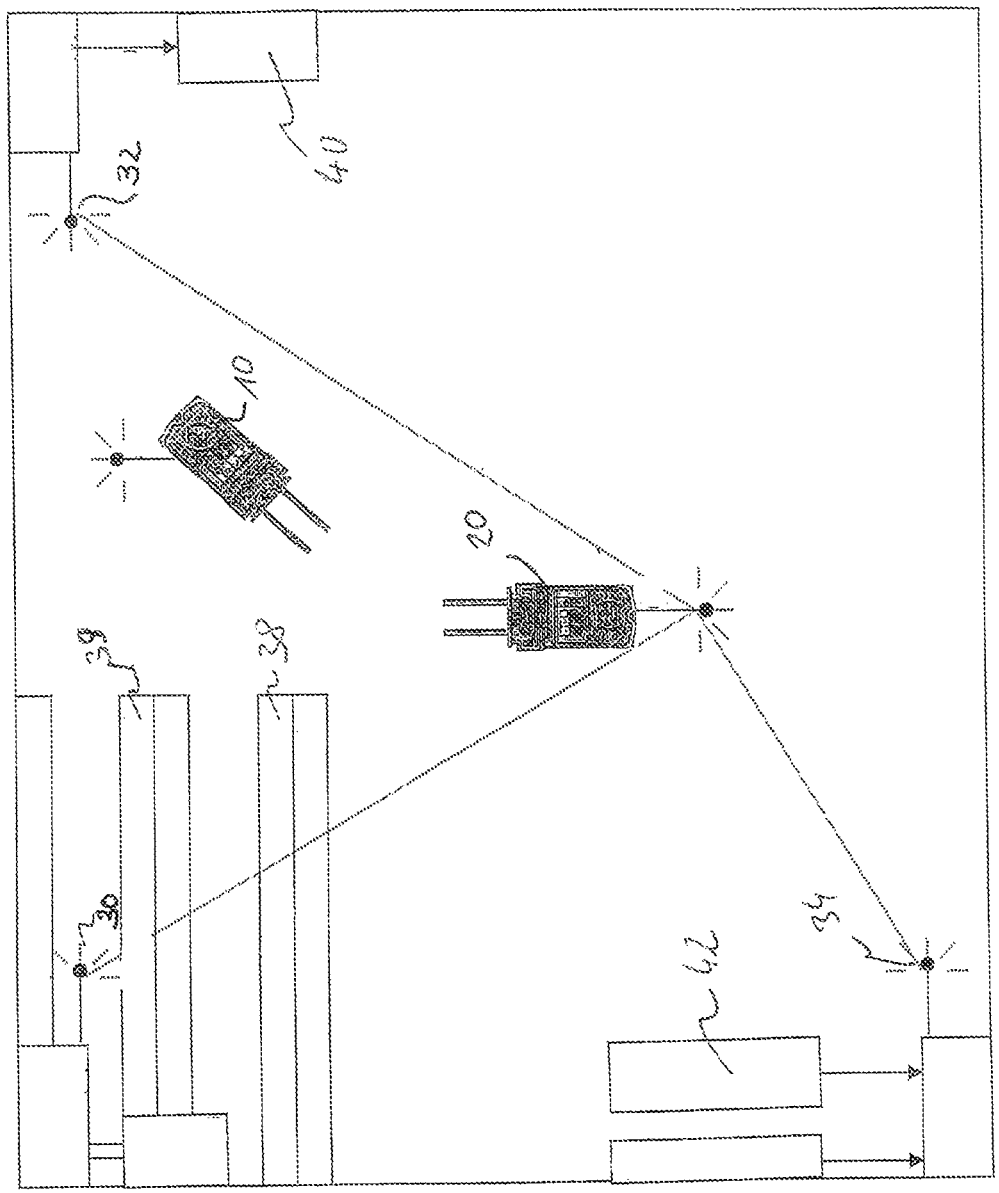

METHOD AND SYSTEM FOR DETERMINING THE POSITION OF AT LEAST ONE INDUSTRIAL TRUCK

CROSS REFERENCE TO RELATED INVENTION

This application is based upon and claims priority to, under relevant sections of 35 U.S.C. § 119, German Patent Application No. 10 2017 102 116.7, filed Feb. 3, 2017, the entire contents of which are hereby incorporated by reference.

BACKGROUND

The present invention relates to a system and related method for determining the position of at least one industrial truck in an area having a plurality of stationary radio stations.

Various approaches are known for determining the position of industrial trucks in warehouse areas and other defined environments. It is, for example, known to place an RFID transponder in the floor. When an industrial truck drives over the RFID transponder, its position can be communicated. In the field of radio engineering, for example, propagation time measurements and/or angle of incidence measurements to determine the position of the industrial truck relative to immovably installed units are known.

A method and system are known from DE 10 2009 004 854 B4 to determine the position of an industrial truck in which a multi-axis gyro sensor, in particular a gyroscope, is used.

A method for approaching a storage bin with an industrial truck is known from DE 10 2001 018 520 A1 in which the current position of the industrial truck is detected, and a preselected lift height value matching the height of the bin to be approached is set for the current position.

A device for determining the position of an industrial truck is known from DE 10 2009 013 671 A1. In this context, a plurality of light sources are positioned at predefined locations, and a beam clearly identifying the light source is emitted by the light sources. An industrial truck evaluates the incoming beam with the inclusion of the relative angles to each other in order to determine its current position and orientation between three light sources.

BRIEF SUMMARY OF THE INVENTION

SLAM methods (simultaneous locating and mapping) are known from mobile robotics, that, as a basis of images from a laser scanner or camera, can identify natural or artificial landmarks, orient themselves thereto, and calculate a position relative to the landmarks. In the field of radio engineering, the satellite-supported GPS (global positioning system) enables worldwide positioning out-of-doors. Inside, transmitting and receiving apparatuses affixed at known locations enable positioning for example by a cell of origin, relative signal strength, determinations of angles (angle of arrival), measurements of time difference (time difference of arrival, TDoA), and run-time measurements (ToF). When determining radio methods, an infrastructure of mobile stations (tags) and stationary radio stations (anchors) is always necessary. The stationary radio stations are also termed beacons. In comparison to wired communication networks, radio networks have a much smaller bandwidth for data exchange.

The object of the invention is to create a way for a comprehensive data exchange in a system for determining the position of at least one industrial truck in an area with a plurality of stationary radio stations.

In an embodiment, a method is provided for transmitting data in a system for determining the location of at least one industrial truck in an area. The system for determining the location or at least one industrial truck in an area is a radio-supported system in which a plurality of stationary radio stations transmit a position signal in response to a position-determining signal. The industrial truck comprises a mobile radio station. The term "position" in this context comprises the spatial position of the industrial truck in the area, and its orientation in this position. The position signal identifies the transmitting stationary radio station and allows the mobile radio station to determine a distance to the stationary radio station. Stationary and mobile radio stations are configured as a transmitting and receiving unit that are configured to receive and transmit radio signals. In an embodiment of the method, a position-determining signal is transmitted by the mobile radio station to the stationary radio stations. The stationary radio stations each transmit a position signal in response to a received position-determining signal. The position signals are received by the mobile radio station The mobile radio station receives positions signals from at least three stationary radio stations. In another embodiment of the method, additional data, such as vehicle data, are appended to the position-determining signal. Likewise, area data can alternatively or in addition be appended to the position signal transmitted by the stationary radio station. The area data contain data on a spatial area that is associated with the stationary radio data. The additional data, be it appended vehicle data or appended area data, are evaluated with the position-determining signal, and/or the position signal. In an embodiment of the method, a current vehicle position is determined from at least three received position signals. The particular advantage of the method is that additional data in the form of vehicle data and area data can be exchanged in the radio network that is designed for the determination of position. The data are thereby closely associated with the position data and can thus be correspondingly further processed in the industrial trucks or the stationary radio stations. In an embodiment, the method uses a single radio network for position-determining and data transmission.

In an embodiment of the method, the vehicle data contain at least one data record on the current position of the industrial truck, vehicle speed of the industrial truck, a steering angle of the industrial truck and/or operating data of the industrial truck on the load, lift height, charge status of its battery, and whether a light is turned on or off. The vehicle data are appended to the position-determining signal that is transmitted by the mobile radio station. The data records contained in the vehicle data can be separated by one or more receiving stationary radio stations and, for example, forwarded or processed via a wired network by the stationary radio station. Data records on the current position, vehicle speed and steering angle are very useful in this regard for discovering pending collisions or a critical collection of industrial trucks in a timely manner. Operating data on the load, lift height, charge status of the battery and light can also be processed centrally and, for example, taken into account when assigning orders to the industrial trucks.

In another embodiment of the method, the vehicle data may contain at least one control command for a stationary radio station that controls an actuator connected to the stationary radio station. The control command can, for example, be aimed at turning interior lighting on or off, or, for example, opening or closing a door passage. In an embodiment, it may also be possible to issue location-dependent control commands in conjunction with the position data of the industrial truck.

In an embodiment of the method, the area data comprises a data record that comprises sensor data from a sensor assigned to the respective radio station, status data from the switchable apparatus associated with the respective stationary radio station, or operating data from the stationary warehouse apparatus associated with the respective stationary radio station. The sensor data within the area data may relate to brightness, light, temperature and the like. This data makes it possible for the industrial truck to adapt its vehicle parameters, for example, with maximum permissible vehicle speed, to the detected sensor data. The data records on the state data comprise switchable apparatuses such as warehouse doors and other apparatuses switchable in a warehouse. The data record on the operating data may relate, for example, to stationary system apparatuses such as stationary conveyor systems provided in specific warehouse areas. Sensor data, status data and operating data in the industrial truck make it possible to react appropriately to the data, issue warning signals to the driver, and adapt vehicle parameters such as the maximum permissible top speed, lift height, etc.

In an embodiment of the method, the area data further comprise at least one control command for an industrial truck that controls a function in the industrial truck with or without confirmation by a driver. Such a control command can, for example, be the command to turn on a light in the industrial truck, or to lower the permissible maximum speed for the industrial truck.

In an embodiment of the method, the stationary radio station forwards received data records related to the vehicle data to a higher-level control unit. This allows transmission of the current situation in the area determined by positioning, in particular the vehicle data on the individual industrial trucks with their position can be currently compiled.

In an embodiment, the stationary radio stations are configured to transmit and receive data with each other. In this manner, data can be exchanged within the radio network apart from the industrial trucks. In an embodiment, each radio station including the stationary radio stations as well as the mobile radio stations is assigned a unique address that enables targeted data exchange between the industrial trucks. It is also possible for the stationary radio stations to specifically exchange data with each other. Accordingly, for example, data can be exchanged by radio between the stationary radio stations when only individual stationary radio stations are connected by wire to another data network.

In another embodiment, a system for determining the location of at least one industrial truck comprises a plurality of stationary radio stations that are configured to transmit a position signal in response to a position-determining signal. Each of the industrial trucks comprises a mobile radio station that is configured to transmit a position-determining signal and receive position signals from radio stations. Moreover, each of the industrial trucks comprises an evaluation unit that is configured to append additional data in the form of vehicle data to a position-determining signal to be transmitted, and to separate area data from the received positions signals. The evaluation unit also determines the current vehicle position from among at least three received position signals. In an embodiment, the position signals of the stationary radio stations can be separated from vehicle data and area data with the assistance of the evaluation unit.

In an embodiment, the evaluation unit is configured to append at least one of the following data records to the position-determining signal as vehicle data: current vehicle position, vehicle speed, steering angle and operating data on the load, lift height, battery charge state, and vehicle light. The evaluation unit is also configured to append at least one control command for a stationary radio station to the position-determining signal as vehicle data that controls an actuator connected to the stationary radio station. In addition to the access of actuators in the stationary radio station, it is also possible to access sensors in the stationary radio station. In this regard, the evaluation unit is configured to determine at least one of the following data records as area data: sensor data from a sensor associated with the respective stationary radio station, status data from a switchable apparatus associated with the respective stationary radio station, and operating data from a stationary warehouse apparatus associated with the respective stationary radio station.

In another embodiment, the evaluation unit is configured to obtain at least one control command from the area data and forward it to a vehicle control to control a function of the industrial truck with or without confirmation by a driver. The area data define vehicle functions in certain areas and can trigger a corresponding activation in the industrial truck.

In another embodiment, a higher-level control unit is configured to receive data records forwarded by the stationary radio stations.

In an embodiment, the radio stations are configured to exchange data with each other. This relates to both mobile radio stations as well as stationary radio stations.

BRIEF DESCRIPTION OF THE DRAWINGS

Preferred embodiments of the invention are explained in greater detail below. In the following:

FIG. 2 illustrates a top plan view of a warehouse with three embodiments of stationary radio stations.

DETAILED DESCRIPTION OF THE INVENTION

Figure 1:
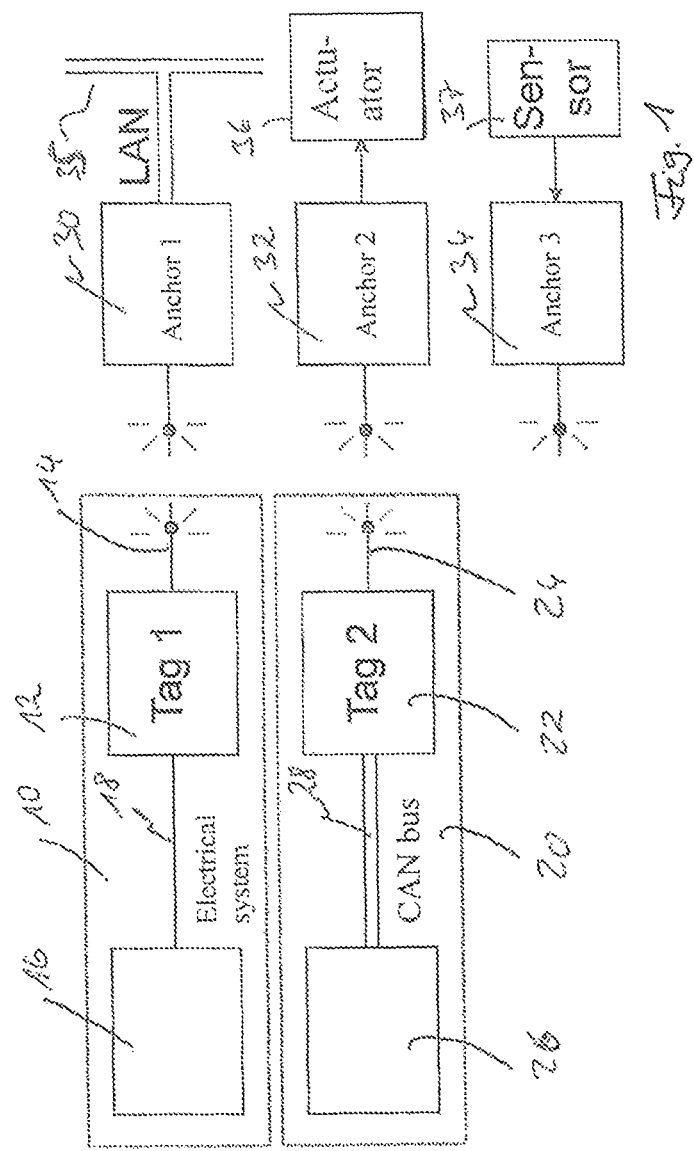
FIG. 1 illustrates a schematic view of an embodiment of two industrial trucks and three embodiments of stationary radio stations.

FIG. 1 shows a schematic view of an industrial truck 10 that comprises a mobile radio unit 12 or mobile radio station. The mobile radio unit 12 further comprises an antenna 14. The industrial truck 10 also comprises a vehicle control 16 that is connected to the mobile radio unit 12 via internal cabling. A wireless connection can also be provided in addition to the wired connection and a CAN bus-based connection.

Still referring to FIG. 1, another embodiment of the industrial truck 20 comprises a mobile radio unit 22 with an antenna 24. The vehicle control 26 is connected via a CAN bus 28 to the mobile radio unit 22.

The stationary radio stations are also termed anchors. As shown in FIG. 1, the anchors 30, 32, 34 are arranged in a warehouse area fixed in space. Each of the anchors comprises an antenna by which the radio signals can be transmitted and received. Referring to FIG. 1, the stationary radio station 30 is connected via a local network (LAN) to the other data processing in the warehouse, and can, for example, access the data of a warehouse management system.

As shown in FIG. 1, the stationary radio station 32 communicates with an actuator 36. The actuator 36 can be actuated by a corresponding radio command from the vehicle via the stationary radio station 32. Accordingly, for example, an approaching industrial truck can trigger an opening of the warehouse door.

Still referring to FIG. 1, the stationary radio station 34 is connected to a sensor which makes it possible to foreword sensor values detected in the warehouse, such as brightness and temperature, to the industrial truck(s) in the warehouse.

FIG. 2 illustrates radiolocating for two industrial trucks 10 and 20. As shown, the industrial truck 20 has transmitted position-determining signals sequentially to the stationary radio stations 30, 32, 34 via its mobile radio station. It is in principle also possible to transmit a single position-determining signal that is received by three or more stationary radio stations 30, 32, 34. The stationary radio stations 30, 32, 34 respond with a position signal after a predetermined time. The distance to the stationary radio station 30, 32, 34 can be determined from the time span during which the response must be waited for. The time span is composed of an always constant response time span that is known by each stationary radio station 30, 32, 34, and the propagation time of the radio signal. The time span corresponds to twice the distance between the mobile and stationary radio station 30, 32, 34. The position of the industrial truck 20 can be determined from the distance to at least three stationary radio stations 30, 32, 34. In this case, the position of the three stationary radio stations 30, 32, 34 is known to the industrial truck 20.

In an embodiment, the vehicle speed and the steering angle are transmitted to the mobile radio station. The transmission is carried out either by the vehicle's own CAN bus 28 (FIG. 1), or via lines 18 (FIG. 1) provided therefor. In the industrial truck, the determination of the position by radio is supplemented with the current data on the vehicle speed and steering angle by using the Kalman filter and processed into precise position information.

The system for precise determination of position also has the advantage that position-dependent signals can be generated for the behavior of the industrial truck. For example, the vehicle speed can be reduced in areas in which many other industrial trucks are located and are moving. The position of the industrial truck can also be exchanged between the industrial trucks either among themselves or via the stationary radio stations 30, 32 34, where movements are recognized, and the vehicle speed can be reduced if the density of vehicles is excessive.

As with the stationary radio stations 30, 32, 34, it is also possible to perform a determination of the distance relative to other vehicles by measuring propagation time in this instance.

Referring to FIG. 2, the industrial truck 20 transmits vehicle data to the stationary radio stations 30, 32, 34. At the same time, area data can be transmitted by the stationary radio stations 30, 32, 34 to the industrial truck 20.

According to FIG. 2, the current position and vehicle speed as well as the steering angle can, for example, be transmitted in the vehicle data of the industrial truck 20. In this manner, it can be discerned whether there is a risk of a collision between industrial truck 20 and industrial truck 10, and whether the industrial truck 20 is approaching the shelves 39, 38 that are located close to the stationary radio station 32. The operating data on the load, lift height, battery charge status and light can be collected by the stationary radio stations 30, 32, 34 and forwarded together with the current position of the industrial truck 20 to a higher-level fleet management system, or a material flow analysis. In this context, it is particularly advantageous for the data to be linked with the location information of the industrial truck 20.

Along with the area data received by the industrial truck 20, data that indicate whether a warehouse door 40 (FIG. 2) is open, or whether a stationary conveying system 42 (FIG. 2) is activated, can also be transmitted to the industrial truck 20.

In addition to the above-described data exchange between the stationary radio stations 30, 32, 34 and industrial trucks, a data exchange between the industrial trucks and stationary radio stations 30, 32, 34 is also possible. With regard to FIG. 1, this means that when the sensor 37 reports an error to the stationary radio station 34, this error can be forwarded by a radio link to the stationary radio station 30 in order to be forwarded from there via the network 35 to a higher-level computer unit.

In an embodiment, all the radio stations of the system are identified by a unique address so that communication among all the participants of the network is possible and addressable.

REFERENCE NUMBER LIST

10 Industrial truck
12 Mobile radio unit
14 Antenna
16 Vehicle control
18 Line
20 Industrial truck
22 Radio unit
24 Antenna
26 Vehicle control
28 CAN bus
30 Stationary radio station
32 Stationary radio station
34 Stationary radio station
35 Network
36 Actuator
37 Sensor
38 Shelf
39 Shelf
40 Warehouse door
42 Conveyor system

The invention claimed is:

1. A method for transmitting data in a system for determining a location of at least one industrial truck comprising a mobile radio station and positioned in an area having a plurality of stationary radio stations, the method comprising:
  transmitting a position-determining signal from the mobile radio station to the plurality of stationary radio stations, the plurality of stationary radio stations receiving the position-determining signal from the mobile radio station;
  transmitting a position signal from each of the plurality of stationary radio stations to the mobile radio station in response to the received position-determining signal, wherein position signals are received by the mobile radio station from at least three stationary radio stations;
  appending additional data to: (1) the position-determining signal; and (2) the position signal,
  wherein:
    the additional data appended to the position-determining signal is vehicle data transmitted by the mobile radio station of industrial truck, and
    the additional data appended to the position signal is area data transmitted by the plurality of stationary radio stations, wherein the area data comprise at least one of the following data records, (1) sensor data from a sensor associated with a respective stationary radio station, and
(2) status data from a switchable apparatus associated with a respective stationary radio station;
receiving the additional data;
evaluating the additional data;
evaluating the position signals received from at least three of the plurality of stationary radio stations; and
determining a current vehicle position from the received position signals.

2. The method according to claim 1, wherein the vehicle data comprise at least one of the following data records:
current vehicle position;
vehicle speed;
steering angle; and
operating data pertaining to at least one of load, lift height, charge status of a battery, and vehicle light.

3. The method according to claim 1, wherein the vehicle data comprise at least one control command for a stationary radio station that controls an actuator connected to one of the plurality of stationary radio stations.

4. The method according to claim 1, wherein the area data comprise at least one control command for the at least one industrial truck that controls a function of the at least one industrial truck.

5. The method according to claim 1, wherein the plurality of stationary radio stations forward the vehicle data to a higher-level control unit.

6. The method according to claim 1, wherein the plurality of stationary radio stations are configured to exchange data between each other.

7. The method according to claim 1, further comprising multiple mobile radio stations that are configured to exchange data between each other.

8. A system for determining a location of at least one industrial truck comprising:
a mobile radio station positioned on the at least one industrial truck and configured to transmit a position-determining signal;
a plurality of stationary radio stations configured to receive the position-determining signal from the mobile radio station and each transmit a position signal to the mobile radio station in response, wherein area data is appended to the position signal that is transmitted by the stationary radio stations to the mobile radio station, wherein the area data comprise at least one of the following data records,
sensor data from a sensor associated with a respective stationary radio station, and
status data from a switchable apparatus associated with a respective stationary radio station; and
an evaluation unit configured to,
append vehicle data to the position-determining signal transmitted by the mobile radio station of industrial truck,
separate area data from the received position signal from each of the plurality of stationary radio stations, and
determine a current position of the at least one industrial truck from at least three received position signals.

9. The system according to claim 8, wherein the evaluation unit is configured to append at least one of the following data records to the position-determining signal as vehicle data:
current vehicle position;
vehicle speed;
steering angle; and
operating data related to at least one of a load, lift height, battery charge state and vehicle light.

10. The system according to claim 8, wherein the evaluation unit is configured to append the vehicle data to the position-determining signal in a form of at least one control command for an actuator that is connected to one of the plurality of stationary radio stations.

11. The system according to claim 8, wherein the area data further comprises at least one control command, and wherein the evaluation unit is configured to separate the at least one control command from the position signal and forward the at least one control command to a vehicle control to control a function of the at least one industrial truck.

12. The system according to claim 8, wherein the plurality of stationary radio stations forward the area data to a higher-level control unit.

13. The system according to claim 8, wherein the plurality of stationary radio stations and the mobile radio station are configured to exchange data between each other.

* * * * *